US007883106B2

(12) United States Patent
Mical

(10) Patent No.: US 7,883,106 B2
(45) Date of Patent: Feb. 8, 2011

(54) INFLATABLE SEAT BELT INCLUDING A THORAX AIRBAG

(75) Inventor: Robert A. Mical, Dearborn Heights, MI (US)

(73) Assignee: Autoliv ASP, Inc., Ogden, UT (US)

( * ) Notice: Subject to any disclaimer, the term of this patent is extended or adjusted under 35 U.S.C. 154(b) by 254 days.

(21) Appl. No.: 11/853,382

(22) Filed: Sep. 11, 2007

(65) Prior Publication Data

US 2009/0066063 A1    Mar. 12, 2009

(51) Int. Cl.
 *B60R 21/18*    (2006.01)
(52) U.S. Cl. .................................... 280/733; 280/801.1
(58) Field of Classification Search ................ 280/733, 280/736, 801.1, 808
 See application file for complete search history.

(56) References Cited

U.S. PATENT DOCUMENTS

| 3,801,156 | A | * | 4/1974 | Granig | ........................ 280/733 |
| 5,161,821 | A |   | 11/1992 | Curtis | |
| 5,474,326 | A |   | 12/1995 | Cho | |
| 6,336,657 | B1 | * | 1/2002 | Akaba et al. | ................. 280/733 |
| 6,340,173 | B1 | * | 1/2002 | Specht | ........................ 280/733 |

| 2003/0038463 | A1 | * | 2/2003 | Stonich et al. | .............. 280/733 |
| 2005/0184491 | A1 | * | 8/2005 | Itoga | ........................ 280/730.1 |
| 2005/0189749 | A1 | * | 9/2005 | Itaoga et al. | ................. 280/733 |
| 2006/0076760 | A1 | * | 4/2006 | Itoga | ......................... 280/733 |
| 2008/0018085 | A1 | * | 1/2008 | Clute | ......................... 280/733 |
| 2009/0160168 | A1 | * | 6/2009 | Itoga | ......................... 280/733 |
| 2009/0184503 | A1 | * | 7/2009 | Itoga | ......................... 280/733 |

FOREIGN PATENT DOCUMENTS

| DE | 299 23 646 | 3/2001 |
| EP | 1 053 133 | 9/2001 |

* cited by examiner

*Primary Examiner*—Paul N Dickson
*Assistant Examiner*—Drew Brown
(74) *Attorney, Agent, or Firm*—Sally J Brown; Brinks Hofer Gilson & Lione

(57) ABSTRACT

A seat belt assembly for use in a seat belt system of a motor vehicle to restrain a vehicle occupant. The assembly includes a belt webbing extending from a first end to a second end and includes tubular webbing extending from the first end and configured to open at a tear seam. An airbag is disposed within the tubular webbing and configured to inflate and deploy through the tear seam. A gas generator is fluidly coupled to the airbag and configured to provide an expanding gas to inflate and deploy the airbag in response to a control signal. A first part of the airbag is configured to inflate above the tubular webbing such that the first part of the airbag is disposed between a side or door of the vehicle and the thorax of the vehicle occupant.

23 Claims, 5 Drawing Sheets

INFLATABLE SEAT BELT INCLUDING A THORAX AIRBAG

BACKGROUND OF THE INVENTION

1. Field of the Invention

This invention relates to automotive safety restraint systems. In particular, the invention relates to safety belt systems having webbing integrated airbags.

2. Description of Related Art

Numerous designs of passive and active automotive occupant restraint systems are known for enhancing occupant protection in the event of a vehicle impact. Passive systems are deployed with no action required by the occupant and include inflatable restraints, air bags for frontal and side impacts, and automatically deployed seat belt systems. Active systems, such as seat belts, have been used for many decades and are manually deployed by the occupant. The conventional seat belt system uses three points of connection with the vehicle structure or a vehicle seat and incorporates a lap belt portion for engaging the occupant's lower torso or pelvis, and a shoulder belt portion for engaging the occupant's upper torso or thorax. When engaged by the occupant, the seat belt restrains movement of the occupant in the event of a vehicle impact or rollover event.

One development in the area of seat belts includes inflatable seat belt systems. An inflatable seat belt system incorporates an airbag into a section of the belt webbing which is inflated by a gas, typically by means of a pyrotechnic inflator, to increase its size and volume. When an inflatable seat belt is activated, the airbag expands and the normally narrow seat belt webbing increases in area and volume to significantly reduce the contact pressure between the belt and the occupant during an impact event. The airbag also acts as a belt pretensioner since the inflatable section fills in the slack area between the occupant and the belt webbing.

However, conventional inflatable seat belts pose a number of design challenges. For example, typical inflatable seat belts dispose the inflatable section in the shoulder belt portion. The increased thickness of the inflatable belt section creates difficulties with cycling the webbing through a D-ring of the seat belt system. Additionally, occupants of different sizes draw differing amounts of the shoulder belt portion across their thorax, creating problems with properly positioning the inflatable belt section. Another disadvantage stems from the fact that they are primarily effective in frontal impact events. To protect against side impacts, an additional side impact or thorax airbag is often installed in the seat or another structure of the motor vehicle.

Motor vehicle designers are continually striving to provide enhanced performance of occupant protection systems while reducing the complexity and weight of vehicle systems while enhancing component packaging.

SUMMARY OF THE INVENTION

In satisfying the above need, as well as overcoming the enumerated drawbacks and other limitations of the related art, the present invention provides a seat belt assembly for use in a motor vehicle to restrain a vehicle occupant. The assembly has a belt webbing extending from a first end to a second end and includes a tubular webbing section and a single panel webbing section. The tubular webbing section extends from the first end at a lower anchorage to a transition point. The solid webbing extends from the transition point to the second end. In some examples, a web stop button may be disposed on the solid webbing proximal to the transition point. The first end is attached to an anchor and is positioned in a lap belt region of the webbing and the second end is attached to a retractor spool. The tubular webbing is configured to open at a tear seam. An airbag is disposed within the tubular webbing and configured to inflate and deploy through the tear seam. A gas generator communicates with the airbag and provides expanding gas to inflate and deploy the airbag in response to a control signal. In one embodiment of the invention, a first part of the airbag is configured to inflate and deploy above the tubular webbing such that the first part of the airbag provides protection for the thorax of the occupant between a side or door of the motor vehicle and the occupant.

In another embodiment of the present invention, the assembly includes a second airbag part configured to inflate and deploy from the tubular webbing along a longitudinal length of the tubular webbing to restrain the pelvis of the occupant.

In some embodiments of this invention, the gas generator is attached to the anchor. In other embodiments, the anchor includes a tubular gas guide having at least one aperture and an internal passage. In those embodiments, the gas generator may be disposed within the internal passage of the tubular gas guide to provide a flow path for the expanding gas to enter the airbag. In one example of the gas guide, the first end of the tubular webbing includes a retaining ring. In this example, the belt webbing is attached to the anchor by axially disposing the tubular webbing through the aperture such that the ring contacts the internal passage.

In other embodiments, the gas generator is fluidly coupled to the airbag by means of a portion of the airbag being disposed through the retaining ring and into the passage of the tubular gas guide. In still other embodiments, the retaining ring is sewn into the first end of the tubular webbing, or the retaining ring may be woven into the first end of the tubular webbing. In another example, the belt webbing is woven as a unitary piece to transition from the tubular webbing to a single layer webbing at the transition point without stitching.

In still other embodiments, of the seat belt system the anchor, retractor and buckle are attached to an interior of the motor vehicle or are attached to a frame of a seat attached to the interior of the vehicle. In other examples, the shoulder potion may be guided into the retractor through a D-ring.

In yet another embodiment of the seat belt system, the latch plate may be slidably disposed along the belt webbing, or it may be fixedly disposed between the lap portion and the shoulder portion.

Further objects, features and advantages of this invention will become readily apparent to persons skilled in the art after a review of the following description, with reference to the drawings and claims that are appended to and form a part of this specification.

DETAILED DESCRIPTION OF THE INVENTION

Figure 1:
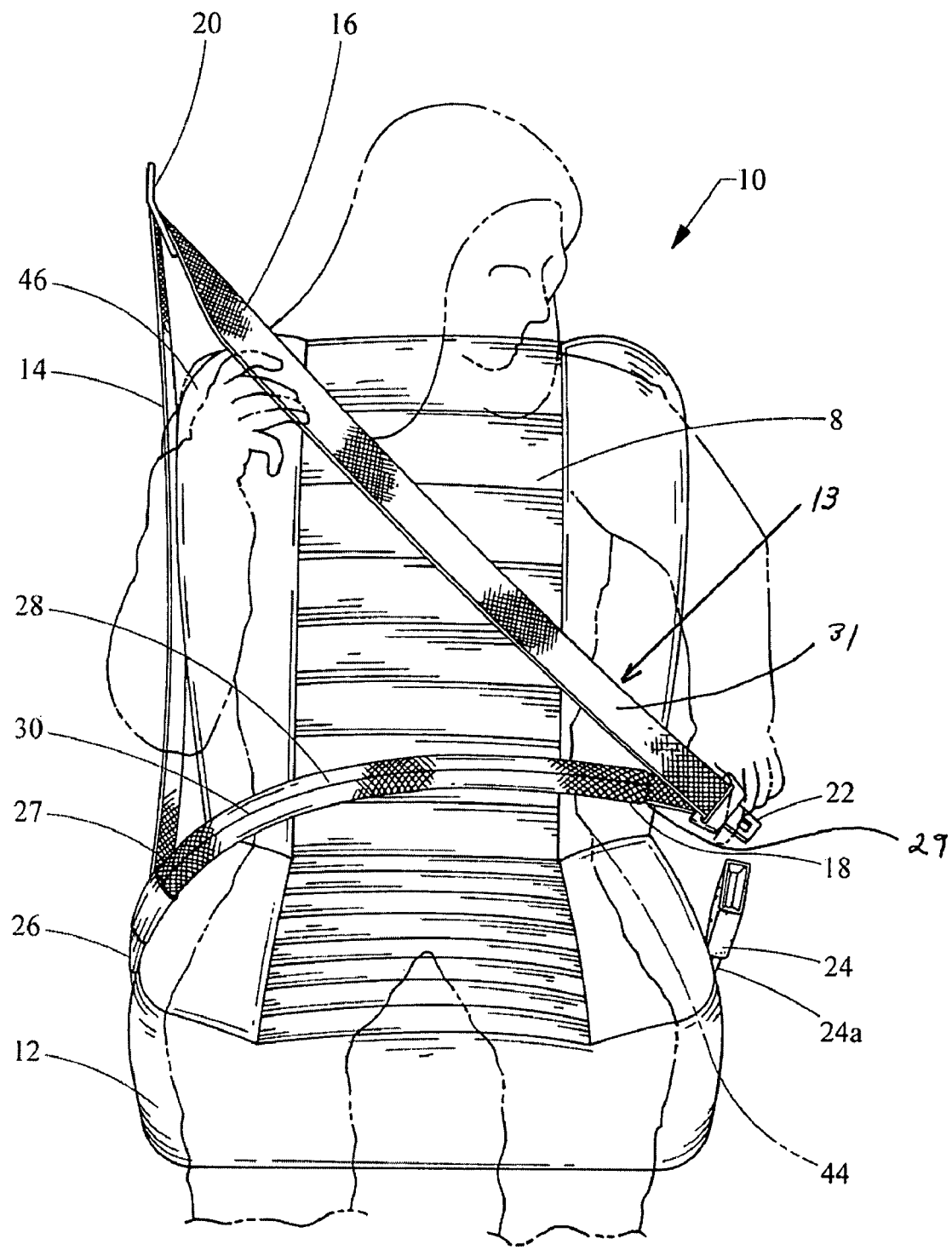
FIG. 1 is a front view of a motor vehicle occupant using a seat belt system incorporating an inflatable seat belt assembly according to the present invention.
Figure 2:
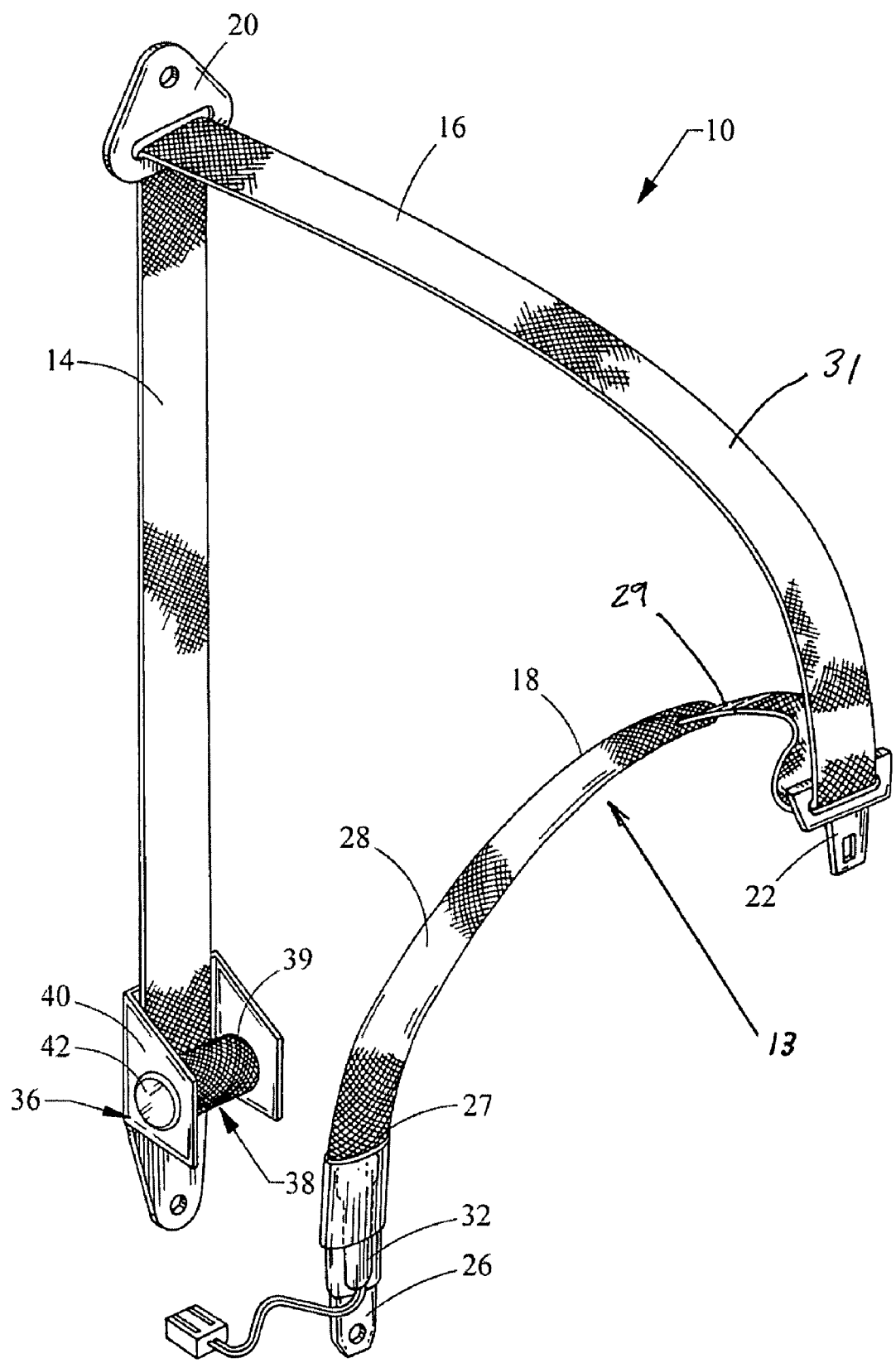
FIG. 2 is an isometric view of the seat belt assembly of FIG. 1 detailing the components of one embodiment of the present invention.

With reference to FIGS. 1 and 2, a seat belt system 10 for protecting an occupant 8 seated in vehicle seat 12 is shown. The seat belt system 10 principally includes a seat belt assembly 13 having a webbing 14. A first end of the webbing 14 attaches to a lower anchor 26 and extends to its second end attached to a retractor assembly 36. The webbing 14 of the assembly 13 includes an upper shoulder belt portion 16, and a lower lap belt portion 18. The shoulder belt portion 16 passes around a "D" ring 20 of the system 10. The "D" ring is typically mounted to the "B" pillar (not shown) of the motor vehicle (the vertical structural member separating the front and rear doors of a four-door vehicle). A seat belt latch plate or tongue 22 is attached to the seat belt webbing 14 and is received by a seat belt buckle 24 which is typically attached to the vehicle floor pan or the seat cushion frame by buckle strap 24a. The embodiment shown incorporates a single spool retractor 36, therefore the seat belt latch plate 22 slides along the webbing 14. In the example shown, the anchor 26, retractor 36 and buckle 24 are arranged such that the seat belt system 10 forms a three point configuration securing the occupant 8 by the lap portion 18 across their pelvis 44 and the shoulder portion 16 across their thorax and shoulder 46.

Figure 3:
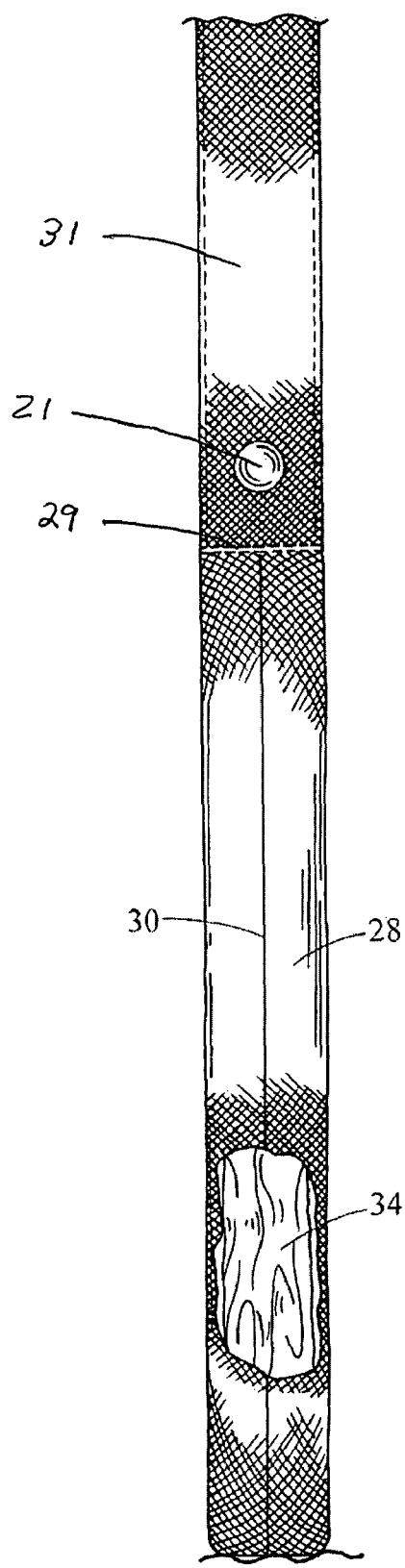
FIG. 3 shows a close-up cut away view of a tubular webbing of the seat belt assembly of FIG. 2 showing an airbag disposed within.

With particular reference to FIG. 2, an isometric view of one embodiment the seat belt system 10 of the present invention is illustrated disassociated from the motor vehicle seat 12 and showing a single spool retractor assembly 36. Turning to the assembly 13, the lap belt portion 18 includes tubular webbing 28 and a conventional solid or single panel section 31. The tubular webbing is coupled at a first end 27 to an anchor 26, extends to a transition point 29, and is configured to open at a tear seam 30 in response to a predetermined internal pressure. The single panel section 31 extends from the transition point 29 to the second end of the webbing 14. The tubular webbing 28 is in fluid communication with a gas generator 32 attached to the anchor 26. As best shown in FIG. 3, an airbag 34 is disposed within the tubular webbing 28 and is also in fluid communication with the gas generator 32. The length of the tubular webbing 28 from the anchor 26 to the transition point 29 is constant, thereby improving the positioning of the airbag 34 with respect to the occupant 8.

Returning to FIG. 2, the gas generator 32 may be activated by a control signal to provide an expanding gas to the airbag 34. The expanding gas causes the airbag 34 to inflate and deploy through the tear seam 30, rapidly expand in volume and, depending on the embodiment, provide side impact protection, reduce the contact pressure between the lap belt portion 18 and the occupant's pelvis 44, or both (see FIGS. 5 and 6). In addition, inflation of the airbag 34 may also act to pretension the webbing 14 in some embodiments.

In one example shown in FIG. 3, a web stop button 21 may be disposed on the single panel section 31, proximal to the transition point 29. This prevents the latch plate 22 from sliding onto the tubular webbing 28 and interfering with deployment of the airbag 34. Likewise, the stop button 21 also prevents the tubular webbing 28 from sliding into and interfering with the "D" ring 20 when the latch plate 22 is disengaged from the buckle 24 and the webbing 14 is retracted by the retractor assembly 36.

As illustrated in FIG. 2, the retractor assembly 36 is preferably disposed behind trim panels and mounted to the "B" pillar of the motor vehicle. Retractor assembly 36 includes a spool assembly 38 mounted to a frame 40. Spool assembly 38 is connected with and stows the webbing 14 of the shoulder belt portion 16, while the end of the lap belt portion 18 of the webbing 14 is fixedly engaged with the anchor 26. The anchor 26 is, for example, attached to the frame 40, the "B" pillar, or another portion of the motor vehicle such as the seat 12. The vertically extending portion of the webbing 14 extending from the spool assembly 38 and wrapping around D-ring 20 is preferably positioned behind a vehicle trim panel on the B-pillar. It is also possible to implement the present invention in a so-called integrated structural seat application in which the spool retractor assembly 36, D-ring 20, and the anchorage for buckle 24 are directly carried by the structure of seat 12.

Additional details of the retractor assembly 36 of the system 10 include a spool 39 which engages the shoulder belt portion 16 of the webbing 14 and rotates to wind-up or pay-out belt webbing 14. A torsional "clock" or "motor" type spring is carried within a spring end cap 42 and rotationally biases the spool to retract the webbing. Spool assembly 38 may further incorporate other spool control mechanisms which are known in accordance with the prior art, including pretensioners, inertia and webbing sensitive locking devices or other belt control devices. "Spool control systems" referred to in this specification describes any system which controls the rotational movement of a webbing spool, thus controlling the extraction and retraction of seat belt webbing. Spool locking devices typically incorporate an inertia sensitive element, such as a rolling ball or pendulum, and cause a sprocket of the spool to be engaged to prevent further withdrawing of webbing from spool 39. Webbing sensitive locking devices sense rapid pay-out of webbing to lock the retractor. Various electronic sensing mechanisms which detect the withdrawal of webbing and/or the connection of the latch plate 22 to the buckle 24 may also be incorporated into retractor assembly 36. As noted above, spool assembly 38 is mounted to a retractor frame 40.

Figure 4A:
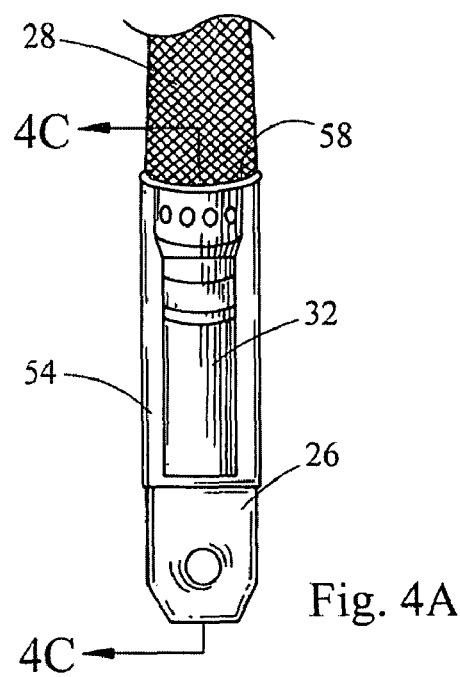
FIG. 4A shows a close-up of an anchor of the seat belt assembly of FIG. 2 attached to an end of the tubular webbing.
Figure 4B:
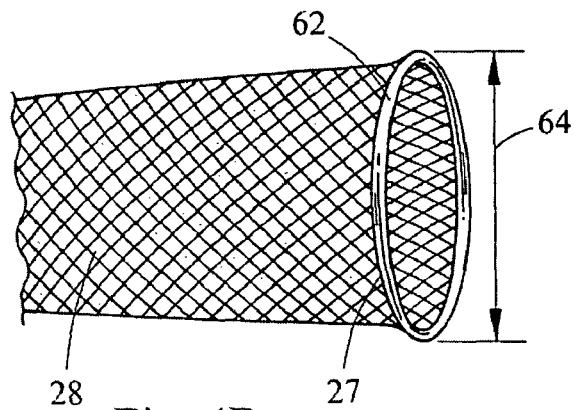
FIG. 4B shows a close-up of an end of the tubular webbing detached from the anchor of FIG. 4A.
Figure 4C:
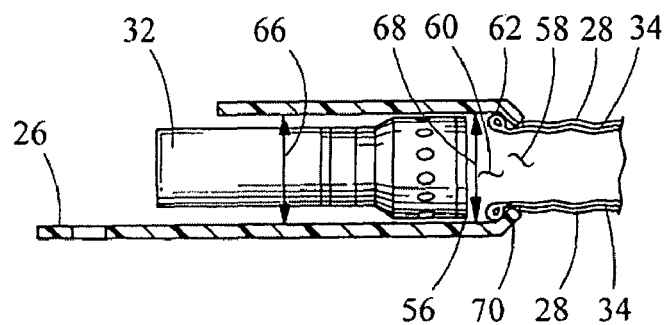
FIG. 4C shows a section view along line 4C-4C of FIG. 4A.

With particular reference to FIGS. 4A-4C, as noted above the gas generator 32 of the assembly 13 is used to provide expanding gas in response to a crash or control signal and is fired or activated by electrical impulses. These impulses are generated by a vehicle restraint system controller (not shown) which receives signals from vehicle crash sensors used to detect the occurrence of a vehicle impact. Gas generator 32 is coupled with the tubular webbing 28 and gas from the gas generator 32 is fluidly communicated through the tubular webbing 28 into the airbag 34.

Figure 5:
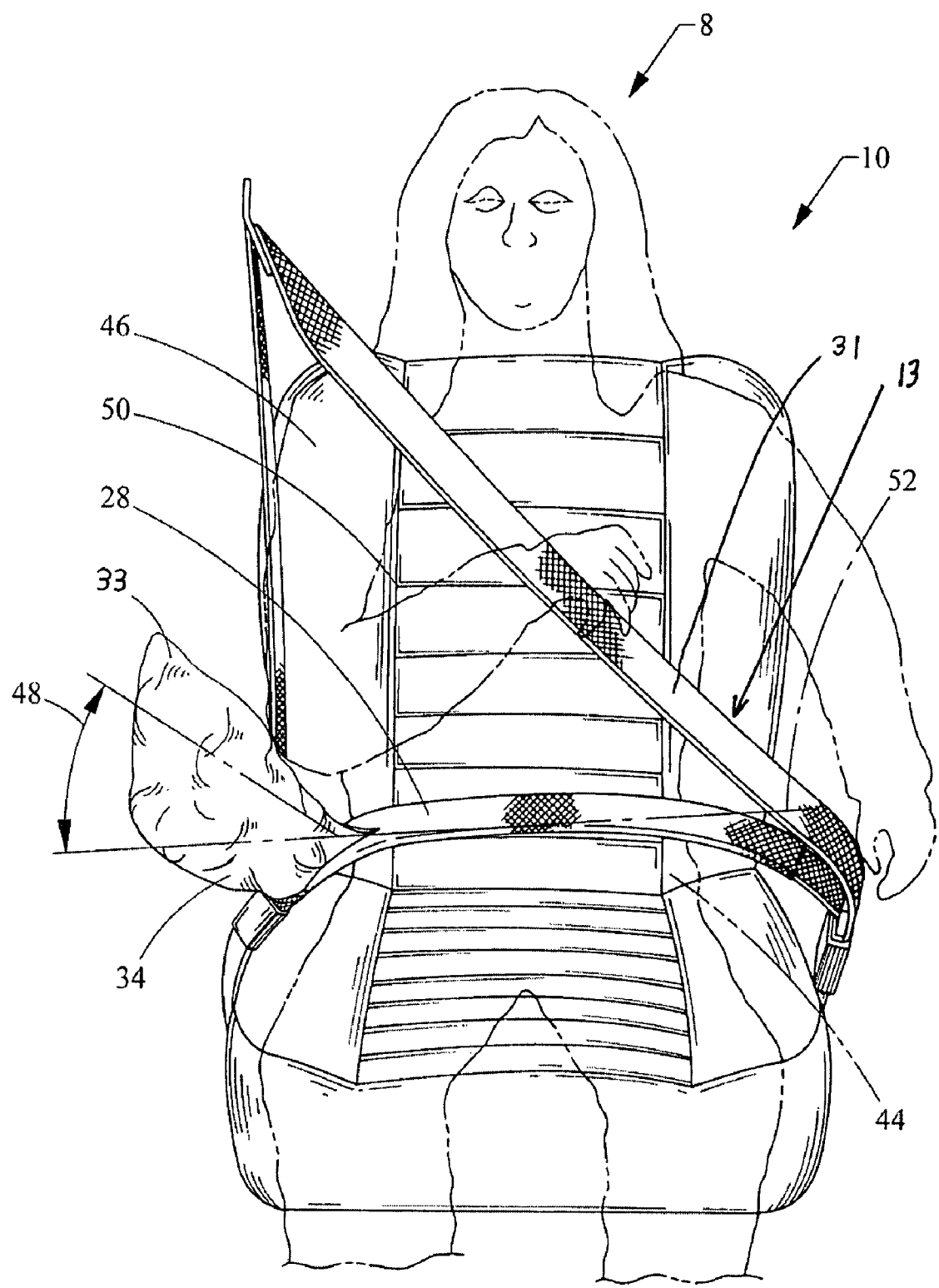
FIG. 5 is a front view of the restraint system of FIG. 1 showing the inflatable seat belt in an expanded state for thorax protection.
Figure 6:
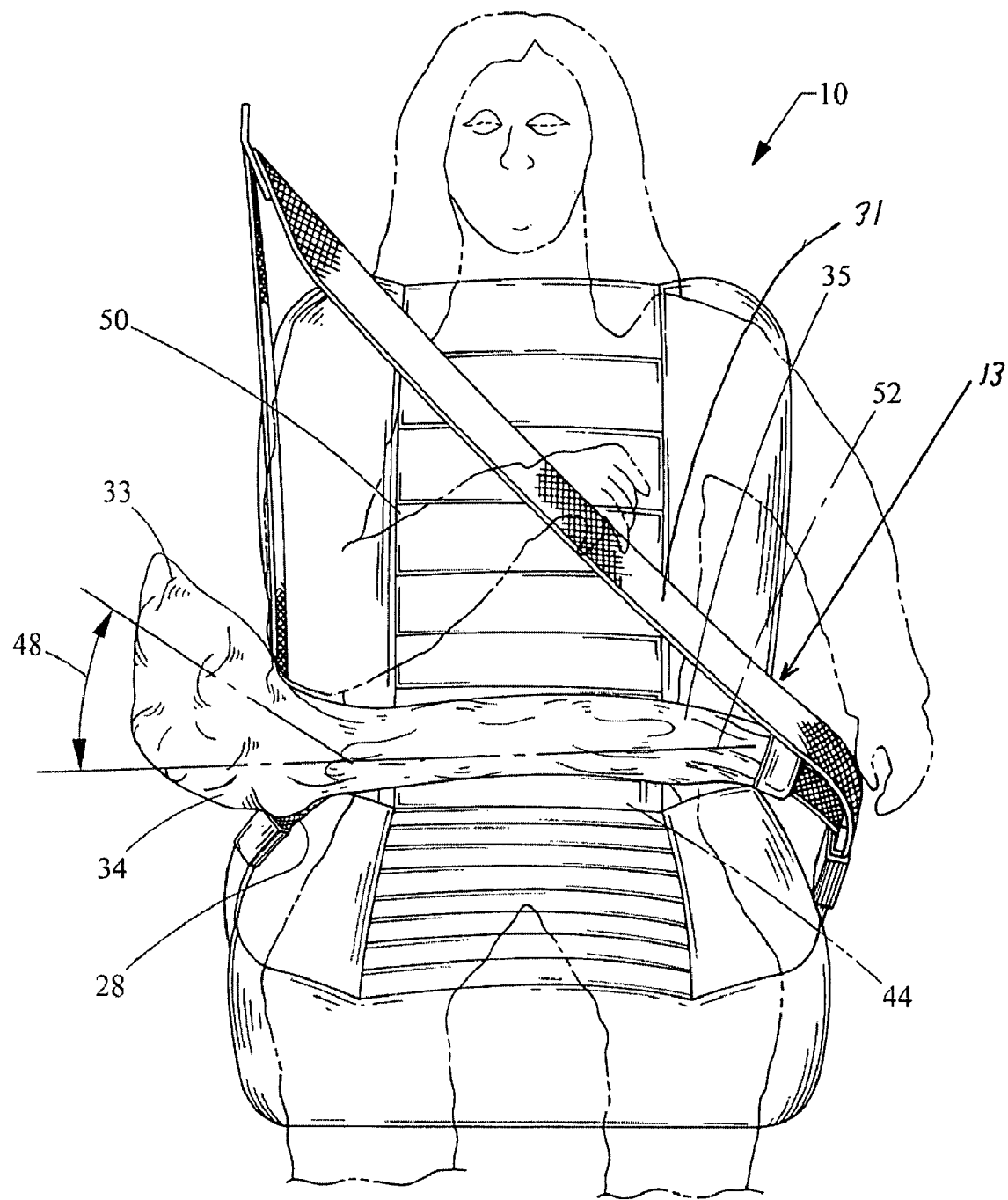
FIG. 6 is a front view of the restraint system of FIG. 1 showing an alternate inflatable seat belt in an expanded state for thorax and pelvis protection.

In a first embodiment, best shown in FIG. 5, the airbag 34 is shaped and folded within the tubular webbing 28 such that upon activation of the gas generator 32 a first or side part 33 of the airbag 34 will inflate and deploy above and to the side of the tubular webbing 28, for example, at an acute angle 48 relative to a horizontal plane 52 of the motor vehicle. This disposes the side part 33 between the occupant 8 and a door or side of the motor vehicle (not shown) to provide protection to the thorax 50 of the occupant 8, particularly in a side impact situation. In a second embodiment, best shown in FIG. 6, the airbag 34 also includes a second or lap part 35. The lap part 35 is configured and positioned within the tubular webbing 28 such that upon activation of the gas generator 32 the lap part 35 inflates along a longitudinal axis of the lap portion 18 to protect the pelvis 44 of the occupant 8. In still another embodiment (not shown), it is possible to omit the side part 33 such that the airbag 34 only includes the lap part 35 and upon inflation primarily protects the pelvis 44.

Returning to FIGS. 4A-4C, the anchor 26 of the assembly 13 is shown in more detail and includes a tubular gas guide 54 having an aperture 58. An inner guide wall 56 of the gas guide 54 defines a internal passage 60 within which at least a portion of the gas generator 32 is disposed. The internal passage 60 provides a substantially straight flow path to guide the expanding gases generated upon activation of the gas generator 32 into the airbag 34.

A retaining ring 62 having a ring outer diameter 64 is coupled to the first end 27 of the tubular webbing 28. The retaining ring may be, for example, woven or stitched into the material of the first end 27 or attached using any other appropriate means. The internal passage 60 includes a primary inner diameter 66 that is larger than the ring outer diameter 64. However, adjacent the aperture 58 the internal passage 60 includes a secondary inner diameter 68. The secondary inner diameter 68 is smaller than the ring outer diameter 64 and may optionally include a lip 70. As is shown in FIG. 4C, the webbing 14 is attached to the anchor 26 by disposing the tubular webbing 28 through the aperture 58 such the ring outer diameter 64 of the retaining ring 62 contacts the secondary inner diameter 68 or the lip 70. Thus, tension applied to the webbing 14 is transferred through the retaining ring 62 into the anchor 26. A portion of the airbag 34 is disposed through the retaining ring 62 and into the internal passage 60 and is fluidly coupled to the gas generator 32

While the above description constitutes the preferred embodiment of the present invention, it will be appreciated that the invention is susceptible to modification, variation, and change without departing from the proper scope and fair meaning of the accompanying claims.

I claim:

1. A seat belt assembly to restrain an occupant of a motor vehicle having a side or a side door, the assembly comprising:
    a belt webbing extending from a first end to a second end and including a lap portion adjacent the first end and a shoulder portion between the lap portion and the second end, the lap portion including tubular webbing extending from the first end to a transition point and being configured to open along a tear seam, and a solid section extending from the transition point to the second end;
    a latch plate carried by the belt webbing and adapted to be fastened to a buckle, the latch plate located on the webbing adjacent to the transition point when the latch plate is fastened to the buckle for the occupant of a predetermined stature;
    an airbag being disposed within the tubular webbing and configured to inflate and deploy through the tear seam, the airbag forming two parts connected together and having a common internal volume;
    at least one gas generator being fluidly coupled to the airbag and configured to provide an expanding gas to inflate and deploy the airbag in response to a control signal;
    the first part of the airbag being configured to inflate and deploy above and to the side of the tubular webbing such that the first part of the airbag is disposed between the occupant and the side or the side door of the vehicle to provide thorax protection; and
    the second part of the airbag being configured to inflate and deploy from the tubular webbing in a generally modular form along a longitudinal length of the tubular webbing from the first part of the airbag to the transition point and extending across the front of the occupant of predetermined stature to provide pelvis protection for the occupant.

2. The assembly of claim 1 wherein the first end is attached to an anchor.

3. The assembly of claim 2 wherein the gas generator is attached to the anchor.

4. The assembly of claim 3 wherein the anchor further includes a tubular gas guide having at least one aperture and an inner guide wall defining an internal passage.

5. The assembly of claim 4 wherein the gas generator is disposed within the passage of the tubular gas guide and arranged to provide a substantially straight flow path for the expanding gas to enter the airbag.

6. The assembly of claim 5 wherein an inner diameter of the aperture is smaller than an outer diameter of a retaining ring attached to the first end of the tubular webbing.

7. The assembly of claim 6 wherein the retaining ring is attached to the first end of the tubular webbing by sewing the ring to the webbing.

8. The assembly of claim 1 wherein belt webbing is woven as a unitary piece that transitions from the tubular webbing to the solid section at the transition point.

9. The assembly of claim 1 wherein a distance from the first end to the transition point is constant.

10. The assembly of claim 1 wherein a web stop button is disposed on the solid section proximal to the transition point.

11. The assembly of claim 1 wherein the second end is attached to a retractor.

12. A seat belt assembly to restrain an occupant of a motor vehicle having a side or a side door, the assembly comprising:
    a belt webbing extending from a first end to a second end and including a lap portion adjacent the first end and a shoulder portion between the lap portion and the second end, the lap portion including tubular webbing extending from the first end to a transition point and being configured to open at a tear seam, and a solid webbing section extending from the transition point to the second end; wherein the first end is attached to an anchor wherein the anchor further includes a tubular gas guide having at least one aperture and an inner guide wall defining an internal passageway, wherein an inner diameter of the aperture is smaller than an outer diameter of a retaining ring attached to the first end of the tubular webbing, the belt webbing is attached to the anchor by axially disposing the tubular webbing through the aperture such that the retaining ring is restrained by the smaller inner diameter of the aperture;
    at least one gas generator being fluidly coupled to the airbag and configured to provide an expanding gas to inflate and deploy the airbag in response to a control signal wherein the gas generator is disposed within the passage of the tubular gas guide and arranged to provide a substantially straight flow path for the expanding gas to enter the airbag;
    wherein the gas generator is attached to the anchor; and
    a first part of the airbag being configured to inflate and deploy above the tubular webbing such that the first part of the airbag is disposed between the occupant and the side or door of the vehicle to provide thorax protection.

13. The assembly of claim 12 wherein the gas generator is fluidly coupled to the airbag by means of a portion of the airbag being disposed through the retaining ring and into the internal passage of the tubular gas guide.

14. A seat belt assembly to restrain an occupant of a motor vehicle having a side or a side door, the assembly comprising:
    a belt webbing extending from a first end to a second end and including a lap portion adjacent the first end and a shoulder portion between the lap portion and the second end, the lap portion including tubular webbing extending from the first end to a transition point and being configured to open at a tear seam, and a solid section extending from the transition point to the second end, the first end is attached to an anchor wherein the anchor further includes a tubular gas guide having at least one aperture and an inner guide wall defining an internal passage;
an airbag being disposed within the tubular webbing and configured to inflate and deploy through the tear seam;
at least one gas generator being fluidly coupled to the airbag and configured to provide an expanding gas to inflate and deploy the airbag in response to a control signal, wherein the gas generator is attached to the anchor;
a first part of the airbag being configured to inflate and deploy above the tubular webbing such that the first part of the airbag is disposed between the occupant and the side or the side door of the vehicle to provide thorax protection, an inner diameter of the aperture is smaller than an outer diameter of a retaining ring attached to the first end of the tubular webbing, the retaining ring is attached to the first end of the tubular webbing by weaving it into the webbing.

15. An inflatable seat belt system to restrain an occupant of a motor vehicle having a side or a side door, the system comprising:
a belt webbing extending from a first end to a second end and including a lap portion adjacent the first end and a shoulder portion between the lap portion and the second end, the first end being attached to an anchor and the second end being attached to a retractor;
a latch plate being carried by the belt webbing and configured for engagement with a buckle, the anchor, the retractor, and the buckle being arranged such that when the latch plate is engaged with the buckle, the latch plate is located on the webbing adjacent to the transition point and the lap portion is disposed across a pelvis of the occupant and the shoulder portion is disposed across a shoulder and thorax of the occupant of a predetermined stature;
the belt webbing lap portion including tubular webbing extending from the first end to a transition point and being configured to open at a tear seam, and a solid section extending from the transition point to the second end, an airbag disposed within the tubular webbing is configured to inflate and deploy through the tear seam, the airbag forming two parts connected together and having a common internal volume and a distance from the anchor to the transition point remains constant to ensure proper positioning of the airbag;
a gas generator attached to the anchor being fluidly coupled to the airbag and configured to provide an expanding gas to inflate and deploy the airbag in response to a control signal;
the first part of the airbag being configured to inflate and deploy above and to the side of the tubular webbing such that the first part of the airbag is disposed between the occupant and the side or the side door of the vehicle to provide thorax protection to the occupant; and
the second part of the airbag being configured to inflate and deploy from the tubular webbing along a longitudinal length of the tubular webbing in a generally modular form from the first part of the airbag to the transition point and extending across the front of the occupant of predetermined stature to provide pelvis protection for the occupant.

16. The seat belt system of claim 15 wherein the anchor further includes a tubular gas guide having at least one aperture and an inner guide wall defining an internal passage.

17. The seat belt system of claim 16 wherein the gas generator is disposed within the passage of the tubular gas guide and arranged to provide a substantially straight flow path for the expanding gas to enter the airbag.

18. The seat belt system of claim 16 wherein an inner diameter of the aperture is smaller than an outer diameter of a retaining ring attached to the first end of the tubular webbing.

19. The seat belt system of claim 15 wherein the anchor, the retractor, and the buckle are attached to an interior of the motor vehicle or a frame of a seat of the motor vehicle.

20. The seat belt system of claim 19 wherein the solid section of the shoulder potion is guided through a D-ring into the retractor.

21. The seat belt system of claim 15 wherein the latch plate is slidably disposed along the belt webbing.

22. The seat belt system of claim 15 wherein a web stop button is disposed on the solid section proximal to the transition point and is configured to prevent the latch plate from contacting the tubular webbing.

23. An inflatable seat belt system to restrain an occupant of a motor vehicle having a side or a side door, the system comprising:
a belt webbing extending from a first end to a second end and including a lap portion adjacent the first end and a shoulder portion between the lap portion and the second end, the first end being attached to an anchor and the second end being attached to a retractor wherein the anchor further includes a tubular gas guide having at least one aperture and an inner guide wall defining an internal passage;
a latch plate being disposed on the belt webbing and configured for engagement with a buckle, the anchor, the retractor, and the buckle being arranged such that when the latch plate is engaged with the buckle, the lap portion is disposed across a pelvis of the occupant and the shoulder portion is disposed across a shoulder and thorax of the occupant;
the webbing lap portion including tubular webbing extending from the first end to a transition point and being configured to open along a tear seam, and a solid section extending from the transition point to the second end, an airbag disposed within the tubular webbing and configured to inflate and deploy through the tear seam, and a distance from the anchor to the transition point remains constant to ensure proper positioning of the airbag;
a gas generator attached to the anchor being fluidly coupled to the airbag and configured to provide an expanding gas to inflate and deploy the airbag in response to a control signal;
a first part of the airbag being configured to inflate and deploy above the tubular webbing such that the first part of the airbag is disposed between the occupant and the side or the side door of the vehicle to provide thorax protection for the occupant wherein the belt webbing is attached to the anchor by axially disposing the tubular webbing through the aperture such that a retaining ring is restrained by the smaller inner diameter of the aperture wherein an inner diameter of the aperture is smaller than an outer diameter of a retaining ring attached to the first end of the tubular webbing.

* * * * *